US010180903B2

(12) United States Patent
Kumar et al.

(10) Patent No.: US 10,180,903 B2
(45) Date of Patent: *Jan. 15, 2019

(54) HYBRID HARDWARE AND SOFTWARE IMPLEMENTATION OF TRANSACTIONAL MEMORY ACCESS

(71) Applicant: Intel Corporation, Santa Clara, CA (US)

(72) Inventors: Sanjeev Kumar, San Jose, CA (US); Christopher J. Hughes, Santa Clara, CA (US); Partha Kundu, Palo Alto, CA (US); Anthony Nguyen, Castro Valley, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,052

(22) Filed: Apr. 1, 2017

(65) Prior Publication Data

US 2017/0206159 A1    Jul. 20, 2017

Related U.S. Application Data

(63) Continuation of application No. 15/299,452, filed on Oct. 20, 2016, which is a continuation of application
(Continued)

(51) Int. Cl.
*G06F 12/0846*    (2016.01)
*G06F 12/0806*    (2016.01)
(Continued)

(52) U.S. Cl.
CPC ........ *G06F 12/0806* (2013.01); *G06F 9/3004* (2013.01); *G06F 9/30043* (2013.01);
(Continued)

(58) Field of Classification Search
CPC ................................ G06F 9/467; G06F 9/528
See application file for complete search history.

(56) References Cited

U.S. PATENT DOCUMENTS 5,347,428 A     9/1994 Carson et al.
5,428,761 A     6/1995 Herlihy et al.
(Continued)

FOREIGN PATENT DOCUMENTS

CN         1755635 A        4/2006
DE      112005002402 T5     8/2007
(Continued)

OTHER PUBLICATIONS

Advisory Action from U.S. Appl. No. 10/956,179, dated Aug. 19, 2008, 3 pages.
(Continued)

*Primary Examiner* — Edward J Dudek, Jr.
(74) *Attorney, Agent, or Firm* — Nicholson De Vos Webster & Elliott LLP

(57) ABSTRACT

Embodiments of the invention relate a hybrid hardware and software implementation of transactional memory accesses in a computer system. A processor including a transactional cache and a regular cache is utilized in a computer system that includes a policy manager to select one of a first mode (a hardware mode) or a second mode (a software mode) to implement transactional memory accesses. In the hardware mode the transactional cache is utilized to perform read and write memory operations and in the software mode the regular cache is utilized to perform read and write memory operations.

15 Claims, 5 Drawing Sheets

Related U.S. Application Data

No. 13/843,890, filed on Mar. 15, 2013, now Pat. No. 9,529,715, which is a continuation of application No. 12/943,848, filed on Nov. 10, 2010, now Pat. No. 8,661,206, which is a continuation of application No. 10/956,179, filed on Sep. 30, 2004, now Pat. No. 7,856,537.

(51) Int. Cl.

| | | |
|---|---|---|
| G06F 9/52 | (2006.01) | |
| G06F 12/0831 | (2016.01) | |
| G06F 9/30 | (2018.01) | |
| G06F 9/38 | (2018.01) | |
| G06F 9/46 | (2006.01) | |
| G06F 12/084 | (2016.01) | |

(52) U.S. Cl.
CPC ...... *G06F 9/30087* (2013.01); *G06F 9/30145* (2013.01); *G06F 9/3834* (2013.01); *G06F 9/3857* (2013.01); *G06F 9/3859* (2013.01); *G06F 9/467* (2013.01); *G06F 9/528* (2013.01); *G06F 12/084* (2013.01); *G06F 12/0831* (2013.01); *G06F 12/0848* (2013.01); *G06F 2212/60* (2013.01); *G06F 2212/621* (2013.01)

(56) References Cited

U.S. PATENT DOCUMENTS

| | | | |
|---|---|---|---|
| 7,587,615 | B2 | 9/2009 | McKenney |
| 7,856,537 | B2 | 12/2010 | Kumar et al. |
| 8,661,206 | B2 | 2/2014 | Kumar et al. |
| 2002/0038407 | A1 | 3/2002 | Mounes-Toussi et al. |
| 2002/0073071 | A1 | 6/2002 | Pong et al. |
| 2004/0039880 | A1 | 2/2004 | Pentkovski et al. |
| 2004/0073909 | A1 | 4/2004 | Arimilli et al. |
| 2004/0085980 | A1 | 5/2004 | Lee |
| 2004/0163082 | A1* | 8/2004 | Tremblay ............ G06F 9/3004 718/101 |
| 2005/0060559 | A1 | 3/2005 | McKenney |
| 2005/0086446 | A1 | 4/2005 | McKenney et al. |
| 2007/0156994 | A1 | 7/2007 | Akkary et al. |
| 2007/0282838 | A1 | 12/2007 | Shavit et al. |
| 2008/0098181 | A1 | 4/2008 | Moir et al. |
| 2009/0172299 | A1 | 7/2009 | Goodman et al. |
| 2009/0172306 | A1 | 7/2009 | Nussbaum et al. |
| 2009/0177847 | A1 | 7/2009 | Ceze et al. |
| 2009/0210457 | A1 | 8/2009 | Abadi et al. |

FOREIGN PATENT DOCUMENTS

| | | |
|---|---|---|
| EP | 1416387 A2 | 5/2004 |
| JP | 2000231536 A | 8/2000 |
| JP | 2003167765 A | 6/2003 |
| JP | 2004152247 A | 5/2004 |
| WO | 2006039174 A1 | 4/2006 |

OTHER PUBLICATIONS

Advisory Action from U.S. Appl. No. 10/956,179, dated May 25, 2010, 3 pages.
Final Office Action from U.S. Appl. No. 10/956,179, dated Jul. 5, 2007, 12 pages.
Final Office Action from U.S. Appl. No. 10/956,179, dated Jun. 10, 2009, 20 pages.
Final Office Action from U.S. Appl. No. 10/956,179, dated Mar. 8, 2010, 10 pages.
Final Office Action from U.S. Appl. No. 10/956,179, dated May 5, 2008, 16 pages.
Final Office Action from U.S. Appl. No. 12/943,848, dated Apr. 18, 2011, 17 pages.
Final Office Action from U.S. Appl. No. 12/943,848, dated Apr. 30, 2013, 14 pages.
Final Office Action from U.S. Appl. No. 12/943,848, dated Oct. 11, 2012, 15 pages.
Final Office Action from U.S. Appl. No. 13/843,890, dated Aug. 20, 2015, 27 pages.
Final Office Action from U.S. Appl. No. 13/843,890, dated Nov. 20, 2014, 29 pages.
Final Office Action from U.S. Appl. No. 15/299,452, dated Mar. 20, 2018, 13 pages.
Herlihy M., et al., "Software Transactional Memory for Dynamic-Sized Data Structures," PODC '03, Jul. 13-16, 2003, Sun Microsystems, Inc., pp. 92-101.
Herlihy M., et al., "Transactional Memory: Architectural Support for Lock-Free Data Structures," In: Proceedings of the 20th Annual International Symposium on Computer Architecture, May 16-19, 1993, pp. 289-300.
International Preliminary Report on Patentability for Application No. PCT/US2005/033917, dated Apr. 12, 2007, 7 pages.
International Search Report and Written Opinion for the Application No. PCT/US2005/033917, dated Feb. 14, 2006, 11 pages.
Marathe V., et al., "A Qualitative Survey of Modern Software Transactional Memory Systems," Department of Computer Science, University of Rochester, Rochester New York, Jun. 2004, 20 pages.
Martinez J.F., et al., "Speculative Synchronization: Applying Thread-Level Speculation to Explicitly Parallel Applications," Proceedings of the 10th International Conference on Architectural Support for Programming Languages and Operating Systems; vol. 36, Oct. 2002, pp. 18-29.
Non-Final Office Action from U.S. Appl. No. 10/956,179, dated Dec. 6, 2006, 12 pages.
Non-Final Office Action from U.S. Appl. No. 10/956,179, dated Dec. 19, 2008, 17 pages.
Non-Final Office Action from U.S. Appl. No. 10/956,179, dated Nov. 15, 2007, 14 pages.
Non-Final Office Action from U.S. Appl. No. 10/956,179, dated Nov. 18, 2009, 11 pages.
Non-Final Office Action from U.S. Appl. No. 12/943,848, dated Apr. 30, 2012, 19 pages.
Non-Final Office Action from U.S. Appl. No. 12/943,848, dated Jan. 4, 2011, 11 pages.
Non-Final Office Action from U.S. Appl. No. 13/843,890, dated Apr. 2, 2015, 27 pages.
Non-Final Office Action from U.S. Appl. No. 13/843,890, dated Jul. 8, 2014, 26 pages.
Non-Final Office Action from U.S. Appl. No. 15/299,452, dated Aug. 10, 2017, 19 pages.
Non-Final Office Action from U.S. Appl. No. 15/477,055, dated Apr. 20, 2018, 24 pages.
Notice of Allowance from foreign counterpart Chinese Patent Application No. 200510107809.5, dated Jan. 8, 2010, 4 pages.
Notice of Allowance from foreign counterpart Chinese Patent Application No. 201010144199.7, dated Mar. 6, 2014, 4 pages.
Notice of Allowance from U.S. Appl. No. 10/956,179, dated Aug. 11, 2010, 5 pages.
Notice of Allowance from U.S. Appl. No. 12/943,848, dated Oct. 10, 2013, 11 pages.
Notice of Allowance from U.S. Appl. No. 13/843,890, dated Apr. 15, 2016, 14 pages.
Notice of Allowance from U.S. Appl. No. 13/843,890, dated Aug. 17, 2016, 9 pages.
Notice of Allowance from U.S. Appl. No. 13/843,890, dated Dec. 18, 2015, 5 pages.
Notice of Allowance from U.S. Appl. No. 15/299,452, dated Jun. 25, 2018, 10 pages.
Office Action form foreign counterpart German Patent Application No. 112005002402.4, dated Dec. 21, 2009, 6 pages.
Office Action from foreign counterpart Chinese Patent Application No. 200510107809.5, dated Jun. 5, 2009, 7 pages.
Office Action from foreign counterpart Chinese Patent Application No. 201010144199.7, dated Dec. 23, 2011, 16 pages.
Office Action from foreign counterpart Chinese Patent Application No. 201010144199.7, dated Sep. 9, 2013, 9 pages.

(56) References Cited

OTHER PUBLICATIONS

Office Action from foreign counterpart Chinese Patent Application No. 20101044199.7, dated Nov. 12, 2010, 7 pages. (English translation only available).
Office Action from foreign counterpart German Patent Application 1120050024024, dated Jul. 28, 2011, 3 pages.
Office Action from foreign counterpart German Patent Application No. 112005002402.4, dated Aug. 14, 2008, 5 pages.
Office Action from foreign counterpart Japanese Patent Application No. 2007-533617, dated May 11, 2010, 4 pages.
Rajwar, R., "Transactional Execution Toward Reliable, High-Performance Multithreading," IEEE Micro, vol. 23 (6), Nov.-Dec. 2003, pp. 117-125.
Rajwar R., "Transactional Lock-Free Execution of Lock-Based Programs," Proceedings of the Tenth International Conference on Architectural Support for Programming Languages and Operating Systems, Oct. 5-9, 2002, 13 pages.

* cited by examiner

HYBRID HARDWARE AND SOFTWARE IMPLEMENTATION OF TRANSACTIONAL MEMORY ACCESS

CROSS REFERENCE TO RELATED APPLICATIONS

The present application is a continuation of U.S. patent application Ser. No. 15/299,452, filed Oct. 20, 2016, entitled, "HYBRID HARDWARE AND SOFTWARE IMPLEMENTATION OF TRANSACTIONAL MEMORY ACCESS", which is a continuation of U.S. patent application Ser. No. 13/843,890, entitled, "HYBRID HARDWARE AND SOFTWARE IMPLEMENTATION OF TRANSACTIONAL MEMORY ACCESS" filed on Mar. 15, 2013, now U.S. Pat. No. 9,529,715, Issued on Dec. 27, 2016, which is a continuation of U.S. patent application Ser. No. 12/943,848, entitled "HYBRID HARDWARE AND SOFTWARE IMPLEMENTATION OF TRANSACTIONAL MEMORY ACCESS" filed on Nov. 10, 2010, now Issued U.S. Pat. No. 8,661,206, Issued on Feb. 25, 2014, which is a continuation of U.S. patent application Ser. No. 10/956,179, entitled "HYBRID HARDWARE AND SOFTWARE IMPLEMENTATION OF TRANSACTIONAL MEMORY ACCESS" filed on Sep. 30, 2004, now U.S. Pat. No. 7,856,537, issued on Dec. 21, 2010, all of which are hereby incorporated herein by reference.

BACKGROUND

Field

Embodiments of the invention relate to the field of transactional memory. More particularly, embodiments of the invention relate to a hybrid hardware and software implementation of transactional memory access.

Description of Related Art

Transactional memory service allows applications, programs, modules, etc., and more particularly application program interfaces (APIs), to access memory in an atomic, consistent, and isolated manner For example, transactional memory may be used as part of a run time engine for managing persistent, pointer-rich data structures, such as databases, and directory services.

An API may be thought of as a language or message format used by an application, program, module, etc., to communicate with a system program such as an operating system or a database management system (DBMS). APIs may be implemented by writing function calls in a program, which provide the linkage to a specific subroutine for execution. Thus, an API implies that some program module or routine is either already in place, or is linked to, in order to perform tasks requested by a function call.

Transactional memory makes it easier to write parallel programs and the use of transactional memory allows for different threads to proceed simultaneously thereby gaining extremely high processing efficiencies. However, currently the programmer has to make a difficult choice in utilizing transactional memory.

One choice is to use a hardware-only implementation of a transactional memory application program interface (API) where the programmer is responsible to keep track of a program's hardware resource requirements and ensure that they do not exceed the hardware resources available. The applicability and usability of transactional memory (hereinafter TM) is limited under this approach. The alternative is to use a software-only implementation of TM API that is easy to program (because there is practically no resource limit) but the software approach suffers from high execution time overheads.

Looking more particularly at transactional memory (TM), TM is derived from database transactions. In databases, a transaction is a group of operations that must satisfy four properties referred to as the ACID properties. The first ACID property is atomicity. Atomicity requires that a database transaction is performed in an all-or-nothing manner. The transaction may be aborted either because the program aborts or due to an error. Atomicity requires that either all of the operations of the transaction are performed or none of them are performed. The second ACID property is consistency. Consistency requires that if the database is in a consistent state before the transaction is performed, the database should be left in a consistent state. The third ACID property is isolation. The isolation property states that all transactions to be performed have to appear to be done in some sort of serial order (i.e., they should be serializable). The last and fourth property required to be under ACID is durability. Durability requires a transaction to survive a machine crash. That is, a transaction has to be written to a stable storage device (e.g. disk) before it can be committed. However, it should be noted that not all implementations of TM, require a transaction to satisfy all of the four above-described properties. For example, in some implementations, durability is not a requirement.

Beyond being compliant with all or some of the above-described ACID properties, transactions and databases utilizing transactional memory are often required to support concurrent execution, deadlock freedom, and non-blocking properties. Typically, concurrent execution of non-conflicting transactions is supported by transactional memory systems. Some database implementations use locks (e.g. two phase locking) to implement these types of transactions. Consequently, deadlocks can occur in these cases. Deadlock freedom is implemented in transactional memory systems by, once detecting a deadlock, recovering from a deadlock by simply aborting some of the transactions. The non-blocking or obstruction-freedom property is required to prevent a thread from hindering the progress of other threads in transactional memory systems.

To date, there are two common approaches to implement transactional memory accesses utilizing application program interfaces (APIs): one of which is a purely hardware implementation; and the other of which is a purely software implementation. The hardware implementation is based on a multi-processor architecture as set forth in Transactional Memory: Architectural Support for Lock-Free Data Structures (Maurice Herlihy, J. Eliot B. Moss: *Transactional Memory: Architectural Support for Lock-Free Data Structures*, International Society for Computers and Their Application, (ISCA) 1993: 289-300). This approach will be hereinafter referred to as the Pure Hardware Approach.

The Pure Hardware Approach provides an efficient and easy-to-use lock-free synchronization method. The Pure Hardware Approach avoids many of the subtle correctness problems associated with parallel programming in addition to guaranteeing freedom from priority-inversion, convoying, and deadlocks typically associated with lock-based synchronization methods.

Unfortunately, the Pure Hardware Approach requires careful resource management by the programmer. As such, the Pure Hardware Approach is very difficult to implement with a wide variety of more advanced processor structures. Typically, software is required to be portable across processor implementation and such careful tuning of resources at the application level limits the use of the pure hardware approach. Furthermore, in operation, the Pure Hardware Approach only utilizes transaction cache in transactional memory, and because of this limited resource, process threads are not guaranteed to complete resulting in program malfunctions.

Another common approach of utilizing transactional memory accesses with APIs is by utilizing a purely software approach, for example, as set forth in Software Transactional Memory for Dynamic-Sized Data Structures (Maurice Herlihy, Victor Luchangco, Mark Moir, William N. Scherer III, *Software Transactional Memory for Dynamic-Sized Data Structures,* Principles of Distributed Computing (PODC) 2003.) This approach will be hereinafter called The Pure Software Approach. The power of the Pure Software Approach is that the programmer may be completely oblivious of the specific techniques employed to provide transactional memory semantics and the API is particularly easy to program. Unfortunately, in operation, the Pure Software Approach technique results in significant slow-downs caused by software overheads.

DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Furthermore, embodiments of the invention will be described in particular embodiments but may be implemented in hardware, software, firmware, middleware, or a combination thereof.

Embodiments of the invention provide a hybrid hardware and software implementation of transactional memory (TM) accesses, for example, for use with application program interfaces (APIs), to deliver high performance accesses by utilizing the embedded hardware support of the processor and then reverting to a software scheme if the hardware resources become exhausted. Thus, the benefits of hardware TM accesses and software TM accesses are simultaneously realized.

In one embodiment, performance penalties associated with TM API software approaches are significantly reduced, as will be discussed, by modifying an original transaction object to enable hardware TM assistance in the most common cases. Thus, common cases are processed utilizing embedded hardware support (e.g., transactional memory cache) for high performance, and if a problem arises, a software TM scheme is reverted to if the hardware resources become exhausted.

Figure 1:
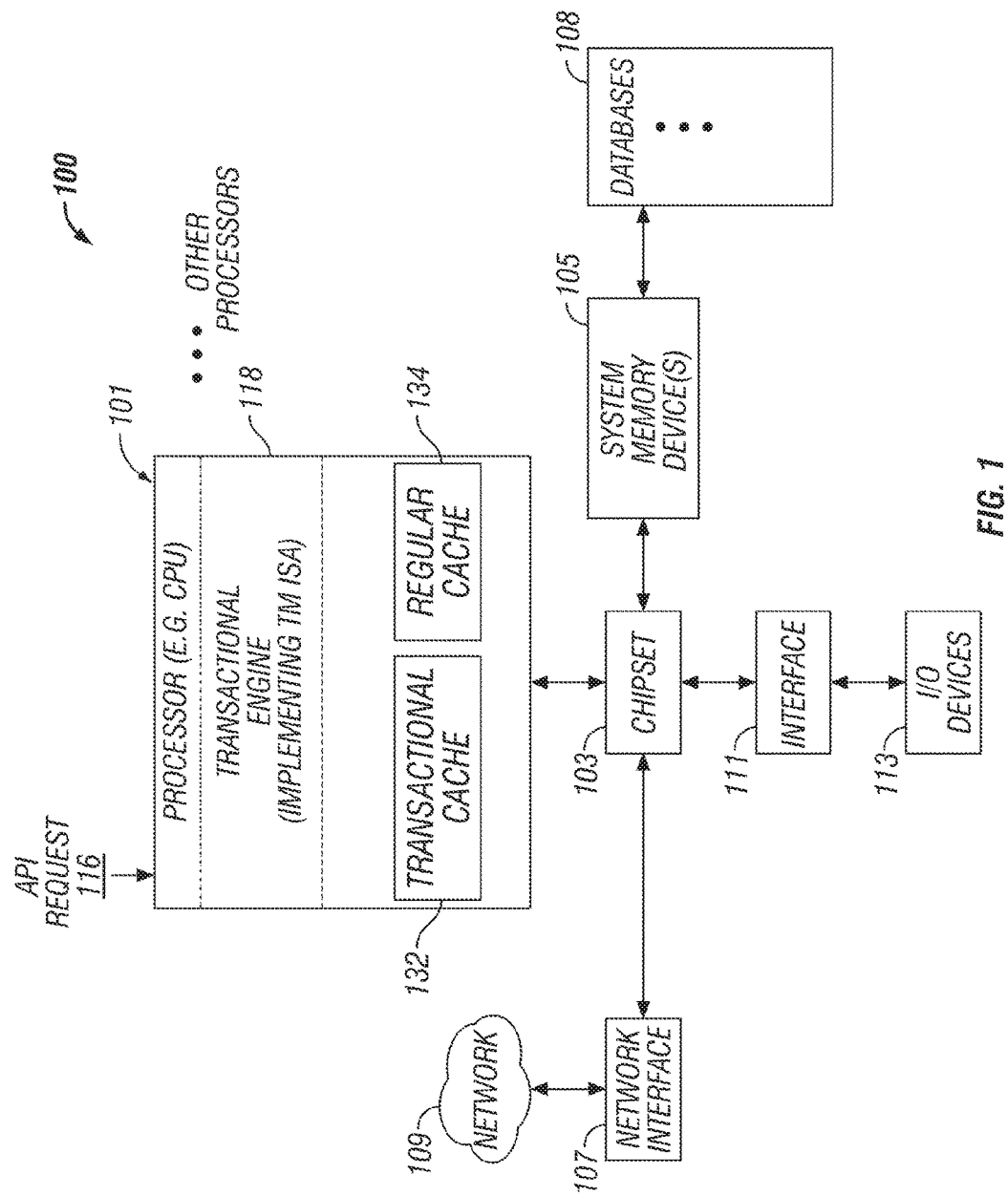
FIG. 1 is a partial block diagram of an example of a computer system configuration, in which embodiments of the invention may be practiced.

FIG. 1 shows a partial block diagram of an example of a computer system configuration 100, in which embodiments of the invention may be practiced. The system configuration 100 includes at least one processor 101 such as a central processing unit (CPU), a chipset 103, system memory devices 105, one or more interfaces 111 to interface with one or more input/output (I/O) devices 113, and a network interface 107.

The chipset 103 may include a memory control hub (MCH) and/or an I/O control hub. The chipset 103 may be one or more integrated circuit chips that act as a hub or core for data transfer between the processor 101 and other components of the computer system 100. Further, the computer system 100 may include additional components (not shown) such as other processors (e.g., in a multi-processor system), a co-processor, as well as other components, etc.— this being only a very basic example of a computer system.

For the purposes of the present description, the term "processor" or "CPU" refers to any machine that is capable of executing a sequence of instructions and should be taken to include, but not be limited to, general purpose microprocessors, special purpose microprocessors, application specific integrated circuits (ASICs), multi-media controllers, signal processors, and micro-controllers, etc. In one embodiment, the CPU 101 is a general-purpose high-speed microprocessor that is capable of executing an Intel Architecture instruction set. For example, the CPU 101 can be one of the INTEL® PENTIUM® classes of processors, such as INTEL® Architecture 32-bit (IA-32) processor (e.g., PENTIUM® 4M).

The CPU 101, the chipset 103, and the other components access system memory devices 105 via chipset 103. The chipset 103, for example, with the use of a memory control hub, may service memory transactions that target system memory devices 105.

System memory devices 105 may include any memory device adapted to store digital information, such as static random access memory (SRAM), dynamic random access memory (DRAM), synchronous dynamic random access memory (SDRAM), and/or double data rate (DDR) SDRAM or DRAM, etc. Thus, in one embodiment, system memory devices 105 include volatile memory. Further, system memory devices can also include non-volatile memory such as read-only memory (ROM).

Moreover, system memory devices 105 may further include other storage devices such as hard disk drives, floppy disk drives, optical disk drives, etc., and appropriate interfaces.

Additionally, system memory devices 105 may in non-volatile memory store a hardware/software transactional memory (TM) engine program for operation by the processor 101 to implement techniques in accordance with embodiments of the invention for a hybrid hardware/software TM engine implemented at the processor 101 to enable transactional memory accesses and transactions (hereinafter the terms access and transaction are used interchangeably) within computer system 100.

System memory devices may also include regions of memory devoted to implement transactional memory transactions with databases 108. For example, databases 108 may include such databases as corporate databases, financial databases, project management databases, directory services, etc., and other pointer-rich data structures that are typically utilized with transactional memory type transactions.

Further, computer system 100 may include suitable interfaces 111 to interface with I/O devices 113 such as disk drives, monitors, keypads, a modem, a printer, or any other type of suitable I/O devices.

Computer system 100 may also include a network interface 107 to interface the computer system 100 with a network 109 such as a local area network (LAN), a wide area network (WAN), the Internet, etc.

The basic computer system configuration 100 of FIG. 1 is an example of one type of computer system that may be utilized in implementing a hybrid hardware and software implementation of transactional memory accesses. It should be appreciated by those skilled in the art that the exemplary FIG. 1 computer system configuration 100 is only one example of a basic computer system and that many other types and variations are possible. Further, those skilled in the art will recognize that the exemplary environment illustrated in FIG. 1 is not intended to limit the embodiments of the invention. Moreover, it should be appreciated that in addition to, or in lieu of, the single computer system configuration 100, clusters or other groups of computers (similar to or different from computer system configuration 100) may be utilized in practicing embodiments of the invention.

More particularly, as shown in FIG. 1, processor 101 utilizing transactional engine 118 may implement a hybrid hardware/software TM access approach. Particularly, transactional engine 118 includes standard TM functionality along with an enhanced TM instruction set architecture (ISA) implemented by the transactional engine 118, as will be discussed in more detail later, to implement embodiments of the invention related to a hybrid hardware/software TM engine. Also, processor 101 includes a transactional cache 132 and a regular memory cache 134 that may be coupled to one another.

As will be discussed in more detail later, the TM ISA implemented with transactional engine 118 enables a hybrid hardware/software TM engine for use with, for example, APIs to deliver high performance using hardware support (e.g., transactional cache 132) in a "hardware mode", and reverts to a software scheme (or "software mode") if hardware cache 132 is exhausted. In this way, API requests 116 to read and write data to memory 105 and databases 108 is optimized. It should be noted that hereinafter "hardware mode" refers to utilizing mainly the transactional cache 132 for high performance whereas "software mode" refers to utilizing mainly the regular cache 134 and other memory resources that provide for slower performance but that are not exhaustible.

While embodiments of the invention and its various functional components have, and will be described, in particular embodiments, it should be appreciated these aspects and functionalities can be implemented in hardware, software, firmware, middleware or a combination thereof.

Figure 2:
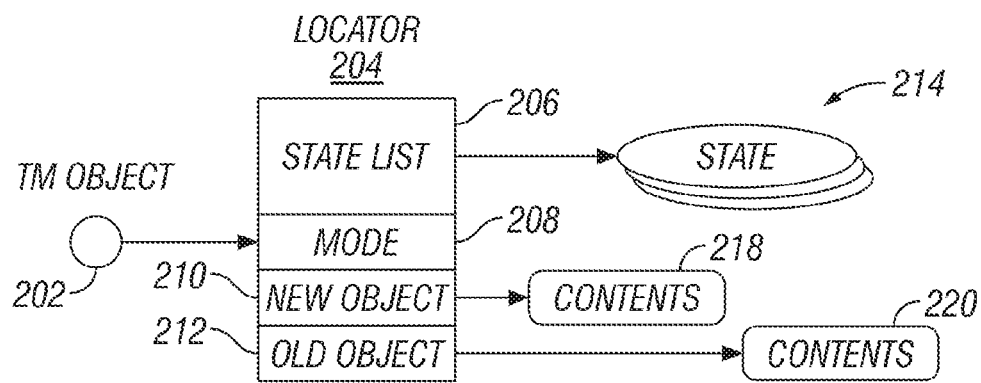
FIG. 2 is a diagram providing an illustration of a transactional memory object, according to one embodiment of the invention.

Turning now to FIG. 2, FIG. 2 is a diagram providing an illustration of a transactional memory object, according to one embodiment of the invention. As shown in FIG. 2, a transactional memory (TM) object 202 is identified by a locator 204. Each shared data object that is not read-only is placed into a container as shown as TM object 202. During a transaction, all TM objects 202 are opened before they are accessed. This associates the objects with the transaction so that the underlying software system can detect conflicts between transactions. Typically, a thread opens an object with an API that specifies whether the object will be accessed in a read-only manner. The data within the transactional object can be manipulated once the object has been opened.

The locator 204 functions as the transactional object locator. There is one transactional object locator that is active for each transactional object, regardless of the number of threads simultaneously accessing the object. The state list 206 stores the memory addresses of the states of the transactions currently accessing the object in the software mode. Typically, the state of a transaction is one of: ACTIVE COMMITTED or ABORTED (214). There is only one state per transaction. Transactions in hardware mode also have a state, but they are never present in the state list 206, as will be discussed.

The TM locator 204 further stores the memory addresses of the contents 218 of the new version of the object 210 and contents 220 of the old version of the object 212. When a transaction opens a TM object to get the latest version of the contents, the version it gets depends on the state of the last transaction that opened the object for writing (i.e., not read-only). If the last writer's state 214 is ACTIVE or ABORTED, the transaction opening the object will receive the old version 220. If the last writer's state 214 is COMMITTED, the transaction opening the object will receive the new version 218.

When a transaction in software mode opens a TM object 202 for writing, it places the address of the latest version (as defined above) in the old object field 212 of the TM locator object 204. The transaction makes a copy of the latest contents, and places the address of this copy in the new object field 210 of the TM locator 204. Until the transaction in software mode commits, the new copy of the object is not accessed by any other thread and is therefore local. Once the transaction commits, the new version of the TM object becomes a shared object and cannot be modified anymore. When a transaction in hardware mode opens a TM object 202 for writing, it does not make a copy of the contents. A transaction in hardware mode directly modifies the latest version of the object, relying on hardware to buffer speculative writes, as will be discussed.

The TM object 202 further includes a mode field 208 to indicate whether the TM object 202 is in read mode or write mode. When a transaction in software mode opens a TM object in either read or write mode 208, it adds the address of its state variable 214 to the state list 206. This allows other threads (in both software and hardware modes) to abort the transaction and removes the need to ever do a validation operation on an individual object. A transaction can be validated by simply examining one location that maintains the state of the transaction (state 214). When a transaction opens a TM object 202 and its mode field 208 is set to read-only, no transactions need to be explicitly aborted if the object is being opened in read-only mode; however, if the object is being opened in write mode, all transactions in the state list 206 need to be aborted if their state 214 is ACTIVE. When a transaction opens a TM object 202 and the mode field 208 is already set to write by the single transaction in the state list 206 (the current writer), this single transaction needs to be aborted if its value is ACTIVE 214, regardless of whether the TM object 202 is being opened in read-only or write mode.

In this implementation, a TM object 202 allows for only a single reader or a single writer at a given time. This restriction may be alleviated, in some embodiments, by allowing multiple transaction fields in the state list 206 to allow for concurrent readers. This provides multiple (but bounded) transactions to open an object at any given time. This limit can be set on a per object basis. As will be discussed, the TM object 202 makes transactional memory transactions more amenable to implementation by a hardware/software hybrid scheme.

Embodiments of the present invention provide a hardware/software transaction instruction set architecture (ISA) that allows for transactional memory transactions to be either implemented in a "hardware mode" or a "software mode". When a transactional memory access is performed in the hardware mode, it is performed primarily by utilizing the transactional cache 132 (FIG. 1). In this way, very high performance can be delivered to the transaction, however, hardware resources sometimes become exhausted. Further, in the hardware mode the processor needs to track all of the memory locations accessed. In the hardware mode conflicts between simultaneously executing transactions are detected and one of the conflicting transactions is aborted. On an abort, the data written during the transaction is invalidated, and on a commit that data must be atomically part of the memory state.

More particularly, embodiments of the invention relate to a hybrid hardware and software implementation of transactional memory access in a computer system. A processor including a transactional cache and a regular cache is utilized in a computer system. A policy manager selects one of a first mode (hereinafter "hardware mode") or a second mode (hereinafter "software mode") to implement transactional memory accesses responsive to an application program interface (API) request to access memory. In the hardware mode the transactional cache is utilized to perform read and write memory operations and in the software mode the regular cache is utilized to perform most read and write memory operations (only one location is stored in the transactional cache, as will be discussed).

The policy manager first selects the hardware mode to perform read and write operations using transactional read and write instructions in the transactional cache. If sufficient memory resources exist in the transactional cache to perform the read and write operations a commit instruction is issued to complete the transactional memory access. However, if conflicting transactional read and write operations or if insufficient memory resources are detected in the transactional cache, then an abort instruction is issued. If an abort instruction is issued for the first mode, the policy manager may select the software mode in which regular read and write operations are performed using regular read and write instructions in the regular cache.

When implementing transactional memory transactions purely in hardware, there is a limit to the number of memory locations that a single transaction can access. If a transaction exceeds this limit, according to one embodiment of the invention, the transaction restarts in the "software mode". As will be discussed, when a hardware transaction is invalidated, the next memory operation executed by that thread will cause an exception. This prevents an invalidated hardware transaction from proceeding and corrupting memory. After the exception, and entry into the software mode, transactional memory accesses are performed primarily by the regular cache and other memory resources (see FIG. 1).

Figure 3:
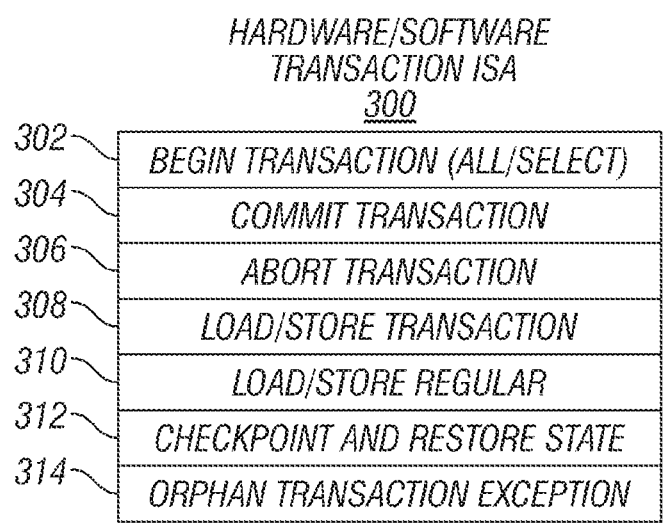
FIG. 3 is a table illustrating an instruction set architecture to implement hardware/software transactional memory transactions, according to one embodiment of the invention.

In order to implement this hybrid hardware and software implementation for transactional memory accesses, embodiments of the invention provide a novel and non-obvious transactional memory instruction set architecture (ISA). With reference to FIG. 3, FIG. 3 is a table illustrating an instruction set to implement hardware/software transactional memory transactions, according to one embodiment of the invention.

As shown in FIG. 3, the hardware/software transaction ISA 300 includes a begin transaction 302 having two modes. Begin Transaction All is to designate "hardware mode" transactions whereas the Begin Transaction Select is used for "software mode" transactions. Particularly, the begin transaction instruction 302 marks the start of a transaction. The Begin Transaction All for "hardware mode" causes all memory accesses to be transactional by default (e.g. utilizing a transactional cache) whereas the Begin Transaction Select makes only the memory operations that are explicitly specified to be transactional.

It should be noted that hardware transactions cannot be nested (as opposed to software-based transactions). Therefore, a new hardware transaction cannot be commenced before a previous transaction has been either committed or aborted. A transaction is aborted either by executing an abort transaction instruction 306 or on encountering a data conflict, as will be discussed.

The commit instruction 304 is used to mark the end of a transaction and allows all of the contents of the transactional memory including the transactional cache to become architectural. Particularly, transactional stores are allowed to modify the system state and transactional loads are purged from the transaction cache. A commit transaction cannot be commenced if a prior transaction was not previously started.

The abort transaction 306 aborts the current transaction and discards all the transactional write data that was previously being buffered. An error will occur if no transaction was previously started.

Further, the hardware/software transaction ISA 300 also includes load/store transaction instructions 308 to perform transactional memory load/store operations.

Hardware/software transaction ISA 300 additionally includes load/store regular instructions to perform non-transactional memory load/store operations.

Checkpoint and restore state instructions 312 are also provided. The checkpoint instruction checkpoints the current register state to memory. The restore instruction restores the current register state from memory.

Hardware/software transaction ISA 300 also includes an orphan transaction exception instruction 314. A transaction is defined to be an orphan if it cannot commit For example, this may occur if another process has written to a location that it has read transactionally. In this case, an orphan transaction can see the memory in an inconsistent state and may cause the program to cause an exception such as divide-by-zero or accessing a memory address that is out of range. Worse yet, it could write wrong values to valid memory locations and corrupt the system state.

The orphan transaction exception instruction avoids these complications. Particularly, the first load instruction executed by a thread, after its transaction has become an orphan, will generate an orphan transaction exception 314, as will be discussed.

Figure 4A:
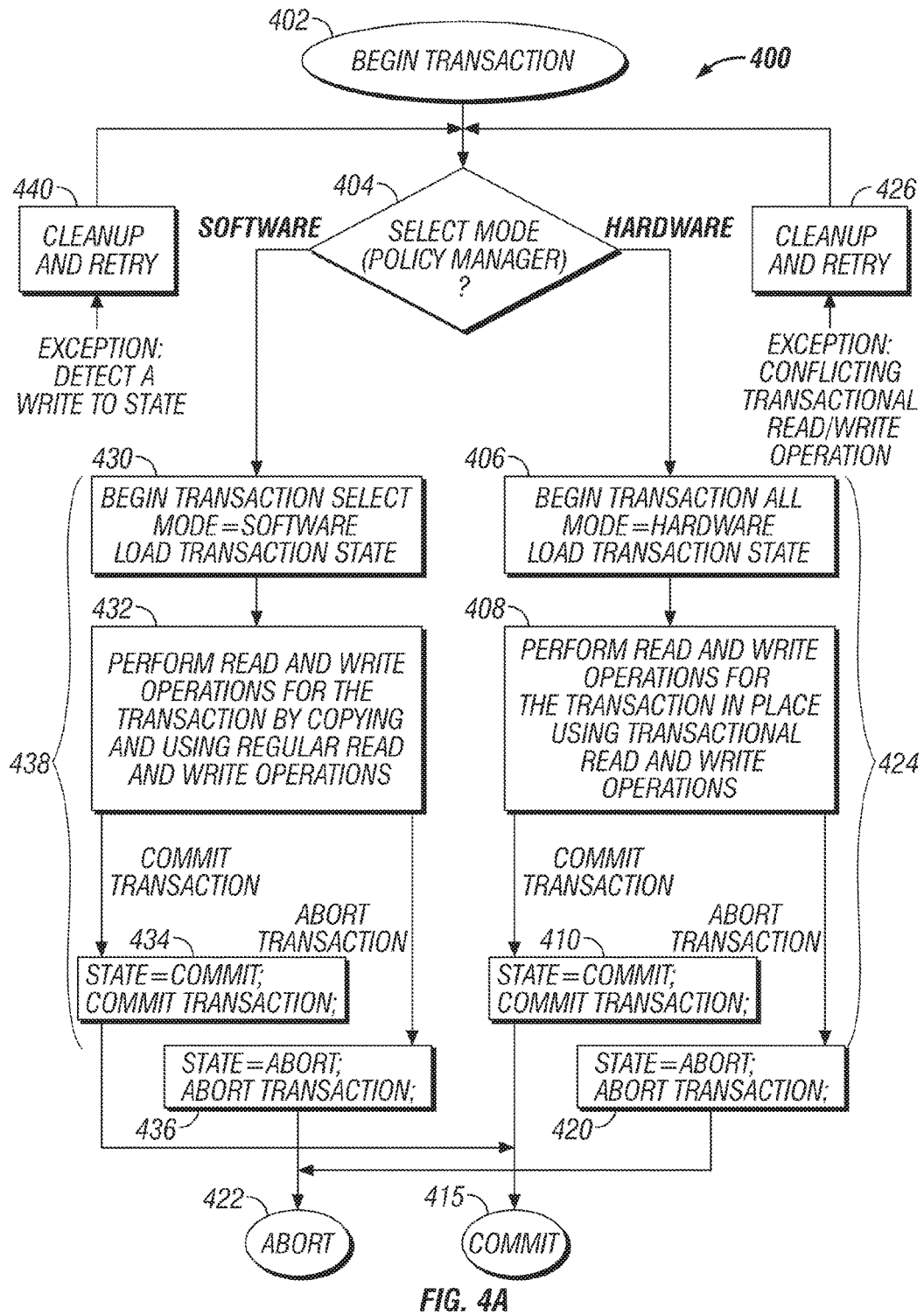
FIG. 4A is a flow chart illustrating a process for hybrid hardware and software implementation of transactional memory accesses, according to one embodiment of the invention.

Turning now to FIG. 4A, FIG. 4A is a flow chart illustrating a process 400 for a hybrid hardware and software implementation of transactional memory accesses, according to one embodiment of the invention. The process 400 takes advantage of the fact, that when implemented in the "hardware mode" (e.g. utilizing primarily the transactional cache of the processor) for most normal cases, transactional memory accesses are completed in a very rapid and optimal fashion. However, the process also takes into account that when implemented by the processor in hardware mode, the transaction may not be able to be completed and therefore, it falls back into a "software mode" which is always guaranteed to complete the transactions. In contrast, the "software mode" primarily uses regular cache and other memory resources. As will be discussed, when a hardware transaction is invalidated, the next memory operation causes an orphan transaction exception, which prevents the invalidated hardware transaction from proceeding and corrupting memory.

Looking particularly at process 400, at block 402, a transaction (e.g., from an API) is begun. At block 404, a policy manager selects either hardware or software mode to begin the transaction. In one embodiment, the hardware mode is selected first to take advantage of the rapid hardware processing (e.g., via a transactional cache), and the software mode can be used as a backup.

After selection of the hardware mode, a Begin Transaction All instruction 302 from the hardware/software transaction ISA 300 is initiated such that the mode is set to hardware. Further, a load transaction instruction 308 from the hardware/software transaction ISA is also initiated to load the transactional memory state. Next, at block 408, read and write operations for the transaction are performed in place on TM objects, as previously discussed, using transactional read and write operations. If the hardware transaction can be completed (e.g., if there are sufficient hardware resources to complete the transaction with the transactional cache), then a commit transaction instruction is generated and, as shown in block 410, the state is set to commit and the transaction is committed. The process for the transaction has thus been committed (block 415).

However, if the transaction cannot be committed in hardware (e.g., there are not sufficient hardware resources in the transactional cache) then an abort transaction instruction is initiated and the state is set to abort and the transaction is aborted (block 420). Thus, the process is aborted (block 422).

When the transaction is aborted, an orphan transaction exception instruction 424 is generated. This may be due to a conflicting transactional read/write operation or insufficient hardware resources. In either case, the transactional memory is cleaned up and the transaction is retried (block 426). Typically, if the failure occurred in the hardware mode, then for the next try, the policy manager will select the software mode.

Briefly, the commit and abort instructions will be discussed in more detail. Particularly, as previously discussed, the transactional memory may be implemented using a transactional cache. For example, as shown in FIG. 1, processor 101 may include transactional cache 132 and a regular cache 134. All locations that are read and written to using load and store transactions 308 from the hardware/software transaction ISA 300 are stored in the transactional cache. All transactional writes stay in the transactional cache until the transaction commits If a location in the transactional cache that was read by the transaction is written to by a different thread, the transaction becomes an orphan and will eventually be aborted.

A commit transaction instruction 304 marks the end of the transaction and allows all the contents of the transaction cache to become architectural (e.g., transactional stores are allowed to modify the system state and transactional loads are purged from the transaction cache).

A transaction is defined to be an orphan if it cannot commit For instance, a transaction may be orphaned if another thread wrote to a location that it read. An orphan transaction can see the memory in an inconsistent state and cause the processor to cause an exception like divide-by-zero or an access to a memory location that is out of range. Worse yet, it could possibly write wrong values to valid memory locations and corrupt the system state. Therefore, when this occurs, an orphan transaction exception instruction 314 is initiated and the action is aborted 422.

Thus, the process 400 and the hardware/software transaction ISA 300 allows exceptions to be used asynchronously to notify a thread if the transaction it is executing has become an orphan. Once a transaction has become orphaned, the thread is aborted, and the thread is not allowed to consume data returned from new load operations from memory.

In order to accomplish this, a special exception is utilized on every load. Particularly, the first load after a thread is orphaned forces an exception on the load, and the thread is aborted. An exception handler is then responsible for branching back to the beginning of the transaction, which may be accomplished as previously discussed as cleanup and retry block 426. Thus, a user exception handler implemented with the abort transaction instruction 306 is responsible for aborting the transaction and unwinding the stack and restarting the aborted transaction utilizing cleanup and retry 426.

Figure 4B:
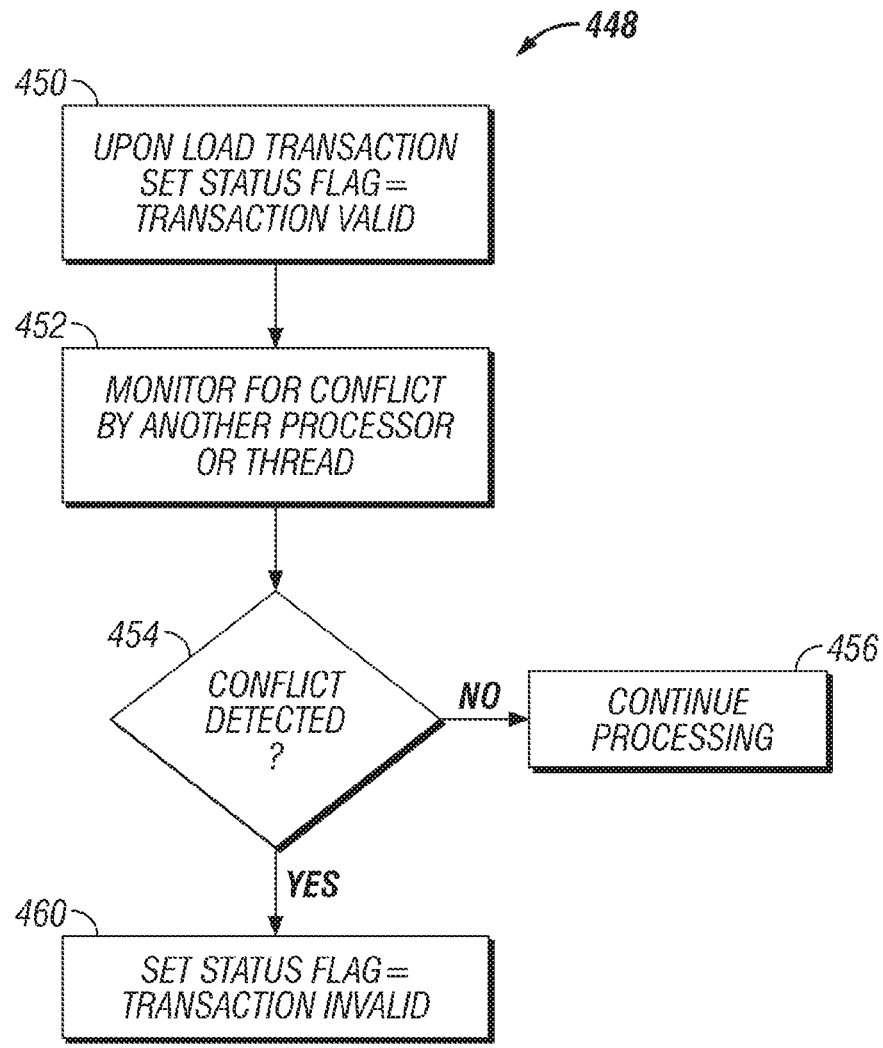
FIG. 4B is a flow diagram particularly illustrating a process to monitor for orphan transactions, according to one embodiment of the invention.

With brief reference to FIG. 4B, FIG. 4B is a flow diagram particularly illustrating a process 448 to monitor for orphan transactions. At block 450, upon a load transaction, a status flag is set to transaction valid. Next, the process 448 monitors for a conflict from by another processor or thread (block 452). If a conflict is not detected at block 454 then continued processing occurs (block 456). However, if at block 454 a conflict is detected, then the status flag is reset to transaction invalid to mark that the transaction has been aborted (block 460). All loads subsequent to the first load transaction check the status flag to verify that it is set to transaction valid before committing (e.g., returning data to the processor). On the other hand, if the status flag is reset, the load is not allowed to be committed and the abort process previously discussed occurs.

Returning back to FIG. 4A, assuming a hardware transaction has been aborted due to a conflicting transaction read/write operation or the exhaustion of hardware resources the policy manager at block 404 may select the "software mode" to ensure completion of the transaction. At block 430 a Begin Transaction Select instruction 302 is initiated from the hardware/software transaction ISA 300 such that the mode is set to software and the transaction state is loaded. It should be noted that when running in software mode, the processor does not treat all memory accesses as transactional. For each transaction, only one location is accessed in a transactional fashion (e.g., utilizing load transaction instructions 308)—the location that contains the state of the transaction.

Next, at block 432, read and write operations are performed for the transaction by copying and using regular read and write operations (e.g. load/store regular instructions 310). Further, the regular cache and other memory resources are utilized instead of the transactional cache. If the read and write operations for the transaction can be performed, a commit transaction instruction 304 is initiated and the state is set to commit (block 434). Thus, the read and write operations to memory are committed (block 415).

On the other hand, if a conflicting transactional write operation is detected then the process may be aborted and the state set to abort (block 436). Thus, the transaction at block 422 is aborted and based on the exception of a conflicting write transaction 438, the process 400 in the software mode, may clean up and retry (block 440) the transactional operation again in the software mode.

In another embodiment of the invention, the previously discussed hardware/software transaction ISA 300 may be utilized to implement locks efficiently. Briefly, when a lock acquire function is invoked, the processor tries to execute the critical section (e.g., the code between the lock acquire and the subsequent lock release) in the hardware mode using transactional memory extensions, and if this fails, the process reverts back to the software mode.

There are three potential reasons why a critical section may fail to complete in the hardware mode. For example, resource exhaustion may occur, in which the transactional cache used to maintain the transactional state overflows. Alternatively, there may be a collision on data. For example, if two threads try to execute their critical section in the hardware mode and attempt to perform conflicting operations on the same data, this may also cause a failure. For instance, one thread may write to a cache line that the other thread has already read. Also, there may be a failure in the transition to the software mode. For example, if a thread grabs a lock in the software mode, all the other threads that were in the middle of the critical section that require that lock will be aborted.

It should be noted that, for any lock, multiple threads can be in the critical section in the hardware mode or a single thread can be holding the lock in the software mode. To enter a lock's critical section in the hardware mode, a thread checks to make sure that a lock is available and enters the critical section without marking it as locked. To enter a lock's critical section in a software mode, a thread checks to make sure that a lock is available and marks it as locked. This will abort any threads that are already in the critical section in the hardware mode and will prevent any new threads from entering the critical section in either the hardware or the software mode.

Figure 5:
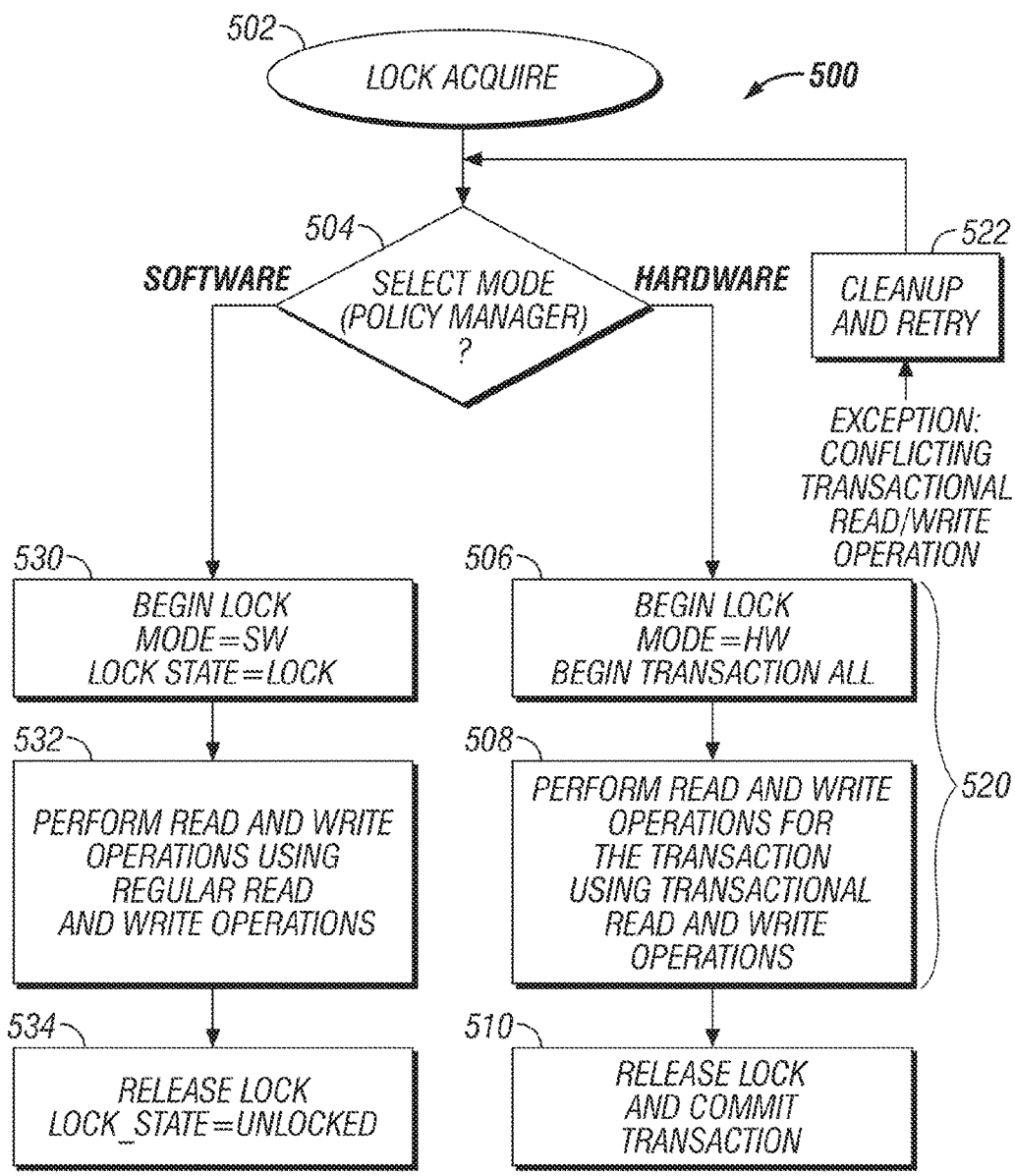
FIG. 5 is a flow diagram illustrating a process to implement locks efficiently utilizing the hardware/software transaction ISA, according to one embodiment of the invention.

Looking to FIG. 5, FIG. 5 is a flow diagram illustrating a process 500 to implement locks efficiently utilizing the hardware/software transaction ISA 300, according to one embodiment of the invention. At block 502, a lock is acquired or initiated. At block 504, the policy manager selects a mode. Typically, as previously discussed, the hardware mode is first chosen to try to most efficiently accomplish the transactional memory transactions. The software mode is then reverted to if the hardware mode cannot complete the transaction.

Next, at block 506, the lock is begun and the mode is set to hardware by the Begin Transaction All instruction 302 of the transaction ISA 300. At block 508, the read and write operations are performed for the transaction (e.g. in the transactional cache) using transactional read and write operations (e.g. load/store transactions 308). If the transaction is completed then the lock is released (block 510) and the transaction is committed.

However, if there is an exception due to a conflicting transactional read/write operation 520 then the lock is aborted. A cleanup and retry operation (block 522) is then initiated and the lock is attempted in the software mode. Thus, at block 504 a policy manager selects the software mode.

In this case, the lock is begun in the software mode and the lock's state is set to lock (block 530). Next (block 532), the read and write operations are performed using regular read and write operations (e.g. load and store regular instructions 310). In the software mode, the lock is typically always completed and the lock is then released and the lock state is set to unlock at block 534. This completes the process 500.

In order to obtain further performance benefits the processor may perform conflict resolution. Particularly, when a data conflict is detected, the processor may resolve the conflict and allow one of the transactions to complete. The remaining conflicting transactions may be deferred or aborted dependent upon whether the any of memory locations they have read have been written to by another thread. Furthermore, when an exception 520 (e.g. an orphan transaction exception) has occurred as previously discussed, a record may be made as to whether the transaction was orphaned due to resource exhaustion or due to a data conflict. An exception handler may then be modified to fall back in the software mode only when the resource is exhausted. When only a data conflict has occurred, a modification may be implemented in which the transaction is retried again in the hardware mode, instead of automatically switching to the software mode.

While embodiments of the present invention and its various functional components have been described in particular embodiments, it should be appreciated the embodiments of the present invention can be implemented in hardware, software, firmware, middleware or a combination thereof and utilized in systems, subsystems, components, or sub-components thereof. When implemented in software or firmware, the elements of the present invention are the instructions/code segments to perform the necessary tasks. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, bar codes, etc. The code segments may be downloaded via networks such as the Internet, Intranet, etc.

Further, while embodiments of the invention have been described with reference to illustrative embodiments, these descriptions are not intended to be construed in a limiting sense. Various modifications of the illustrative embodiments, as well as other embodiments of the invention, which are apparent to persons skilled in the art to which embodiments of the invention pertain, are deemed to lie within the spirit and scope of the invention.

What is claimed is:

1. A processor comprising:
    transactional memory circuitry to process transactional memory operations including load operations and store operations,
        the transactional memory circuitry to process a first instruction to indicate the start of a first transaction, a second instruction to indicate an end the first transaction, and a third instruction to abort processing of the first transaction;
    transaction failure detection circuitry to detect conflicting load and store operations, wherein the conflicting load and store operations include modification, by a second transaction, of data loaded by the first transaction;
    transaction status circuitry to store an indication of whether the first transaction is valid or invalid based on whether the transaction failure detection circuitry detects conflicting load and store operations;
    a cache to store data related to the first transaction, the cache to be updated responsive to transactional load and store operations; and
    locking circuitry to allow a transaction to acquire a lock prior to execution of a set of instructions,
    wherein the transactional memory circuitry is to, upon that the lock is found to be free, first attempt to transactionally execute the set of instructions without first acquiring the lock, and, in response to at least one failure to transactionally execute the set of instructions, to revert to software to acquire the lock and thereafter reattempt to execute the set of instructions.

2. The processor as in claim 1 further comprising:
    transaction checkpoint circuitry to store an architectural state.

3. The processor as in claim 2 further comprising:
    restore circuitry to restore the architectural state.

4. The processor as in claim 1 wherein the transactional memory circuitry is to commit the first transaction if the first transaction completes without a failure.

5. The processor as in claim 1 wherein the software comprises a failure handler.

6. An apparatus comprising:
    transactional memory means to process transactional memory operations including load operations and store operations,
        the transactional memory means to process a first instruction to indicate the start of a first transaction, a second instruction to indicate an end the first transaction, and a third instruction to abort processing of the first transaction;
    transaction failure detection means to detect conflicting load and store operations, wherein the conflicting load and store operations include modification, by a second transaction, of data loaded by the first transaction;
    transaction status means to store an indication of whether the first transaction is valid or invalid based on whether the transaction failure detection means detects conflicting load and store operations;
    cache means to store data related to the first transaction, the cache means to be updated responsive to transactional load and store operations; and
    locking means to allow a transaction to acquire a lock prior to execution of a set of instructions,
    wherein the transactional memory means is to, upon that the lock is found to be free, first attempt to transactionally execute the set of instructions without first acquiring the lock, and, in response to at least one failure to transactionally execute the set of instructions, to revert to software to acquire the lock and thereafter reattempt to execute the set of instructions.

7. The apparatus as in claim 6 further comprising:
    transaction checkpoint means to store an architectural state.

8. The apparatus as in claim 7 further comprising:
    restore means to restore the architectural state.

9. The apparatus as in claim 6 wherein the transactional memory means is to commit the first transaction if the first transaction completes without a failure.

10. The apparatus as in claim 6 wherein the software comprises a failure handler.

11. A method comprising:
    processing a first instruction to indicate the start of a first transaction;
    processing a second instruction to indicate an end the first transaction;
    processing a third instruction to abort processing of the first transaction;
    detect conflicting load and store operations in the first transaction, wherein the conflicting load and store operations include modification, by a second transaction, of data loaded by the first transaction;
    storing an indication of whether the first transaction is valid or invalid based on whether conflicting load and store operations have been detected;
    storing data related to the first transaction in a cache, the cache to be updated responsive to transactional load and store operations; and
    allowing a transaction to acquire a lock prior to execution of a set of instructions,
    upon that the lock is found to be free, first attempting to transactionally execute the set of instructions without first acquiring the lock, and, in response to at least one failure to transactionally execute the set of instructions, reverting to software to acquire the lock and thereafter reattempt to execute the set of instructions.

12. The method as in claim 11 further comprising:
    store storing an architectural state.

13. The method as in claim 12 further comprising:
    restoring the architectural state.

14. The method as in claim 11, further comprising: committing the first transaction if the first transaction completes without a failure.

15. The method as in claim 11 wherein the software comprises a failure handler.

* * * * *